Figure 1:
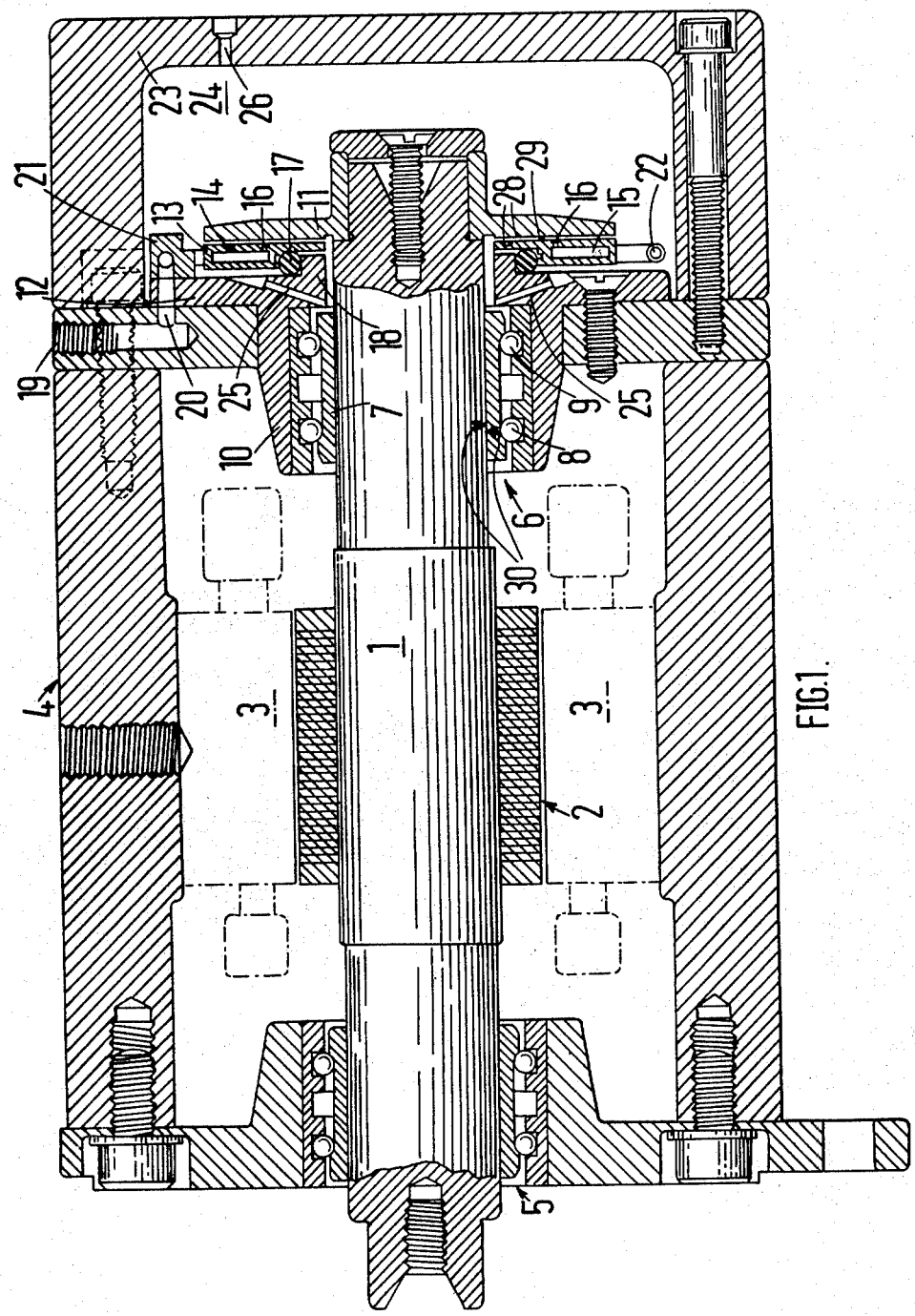

ically, to the fixed
United States Patent
Kerr

[11] 3,761,151
[45] Sept. 25, 1973

[54] THRUST BEARING
[75] Inventor: John Kerr, Cambuslang, Scotland
[73] Assignee: National Research Development Corporation, London, England
[22] Filed: Aug. 17, 1972
[21] Appl. No.: 281,481

[52] U.S. Cl. .............................................. 308/160
[51] Int. Cl. .......................................... F16c 17/04
[58] Field of Search .............................. 308/160, 9

[56] References Cited
UNITED STATES PATENTS
3,160,450  12/1964  Gentiluomo ..................... 308/160

Primary Examiner—Charles J. Myhre
Assistant Examiner—Frank Susko
Attorney—Gordon W. Daisley

[57] ABSTRACT

A fluid thrust bearing has opposed surfaces, preferably normal to the rotational axis of, respectively, a thrust member of the rotary element of the bearing and a bearing pad fixed preferably resiliently, to the fixed bearing structure and supplied with pressurised fluid emerging through feed holes into a bearing space between the opposed surfaces. The leakage from the bearing space is collected in a chamber surrounding the bearing and pressure is caused to build up in this chamber due to an orifice restricting the escape of fluid from the chamber to atmosphere. The pressure in the chamber acts on surfaces of the rotary element in opposition to forces due to the pressure in the bearing space, these pressures varying differentially on any change in the distance between the opposed surfaces bounding the bearing space. The bearing can thus support axial loads in either direction.

Supply of fluid to the bearing pad may be through a coiled capillary tube communicating with a plenum chamber in the pad, from which fluid passes into the bearing space through one or more restrictor orifices which constitute the feed holes.

Preferably the opposed surfaces have an area large enough to give dynamic stiffness to the bearing due to a "squeeze" effect, in the presence of axial oscillatory forces of a frequency higher than that at which the pressure in the bearing space, due to the flow of fluid through the feed holes, can be caused to fluctuate.

7 Claims, 4 Drawing Figures

THRUST BEARING

This invention relates to a fluid-filled thrust bearing.

According to the invention there is provided a thrust bearing comprising a rotary element mounted for rotation in a fixed member by means of a journal bearing, the rotary element having an annular surface of revolution generated by a line inclined to the axis of rotation, an anchored bearing pad having an annular surface conforming to the said surface of revolution, one or more fluid feed holes in the surface of the pad for access of pressurised fluid to the bearing space between the two conforming surfaces, a chamber surrounding the rotary element into which flows fluid escaping from the fluid bearing space, at least one fluid-flow-restricting passage for the escape of fluid from the said chamber whereby pressure may build up in the chamber and act upon a part of the rotating member in opposition to axial forces arising from the pressure of fluid in the bearing space whereby the bearing is capable of supporting axial loads upon it in either direction.

Preferably a journal bearing adjoining the thrust bearing is a fluid-dynamic bearing whereby the leakage path, via such bearing, from the chamber is minimised.

The journal bearing may be of the type described in United Kingdom Pat. specification No. 1,101,433 wherein a bearing is described comprising a shaft surrounded by a sleeve which is mounted in fixed parts of the apparatus through the medium of elastomeric O-rings. Where a journal of this type is used the pad of the thrust bearing is preferably also resiliently anchored to fixed parts of the bearing assembly so that it can accommodate itself to any rocking or other motions of the rotary member which may be permitted by the resilient mounting of the journal bearing sleeve.

Conveniently the bearing pad encloses an annular plenum chamber from which feed holes lead to the bearing space the plenum chamber being supplied with pressurised fluid via a flexible duct joining, at one of its ends, the plenum chamber and, at the other of its ends, a fluid access passage in fixed parts of the bearing.

Figure 2:
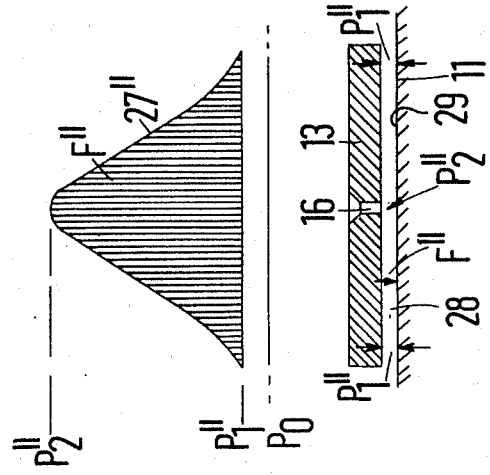
Figure 3:
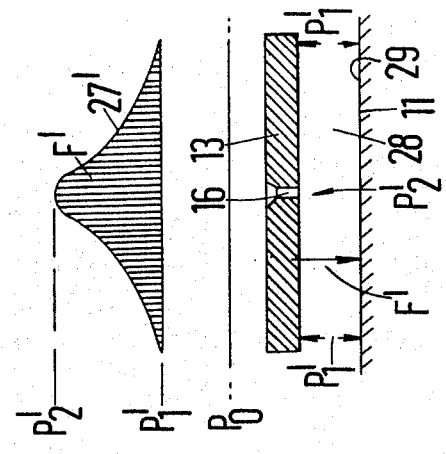
Figure 4:
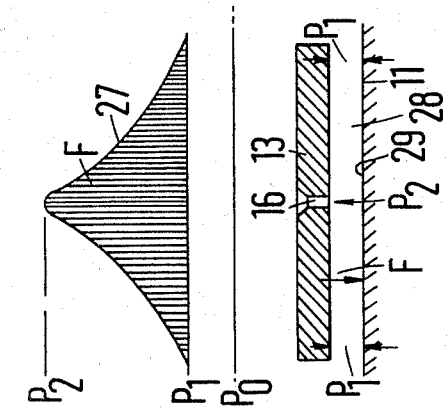

The invention will be more readily understood from the following description of an embodiment thereof illustrated in the accompanying drawings in which:

FIG. 1 is a longitudinal section of apparatus incorporating a bearing according to the invention; and FIGS. 2, 3 and 4 are diagrams illustrating pressure relationships existing in the bearing under three different conditions of operation.

In FIG. 1 a shaft carries the rotor 2 surrounded by the stator 3, of an electric motor mounted in a housing generally indicated at 4. Shaft 1, on either side of rotor 2 is supported in journal bearings generally indicated at 5 and 6. These journal bearings are substantially identical with one another and only bearing 6 will be described. A bearing sleeve 7 surrounds shaft 1 and is supported in a cylindrical bearing shroud 10 via elastomeric O-rings 8 and 9. This bearing is of the type described in United Kingdom Pat. specification No. 1,101,433 and will not be further described herein.

A thrust plate 11 is secured to shaft 1 by means which are apparent in the drawing and this plate 11 has a flat annular surface 29 on the side nearest to rotor 2.

Integral with the journal bearing shroud 10 is an annular plate 12 secured to the housing 4 by means which are apparent in the drawing. In the space between plate 12 and plate 11 there is accommodated a bearing pad 13 which presents an annular surface 14 to the annular surface 29 of thrust plate 11. The radially outer part of bearing pad 13 is thicker overall in the axial direction than the inner part and is hollow to provide a plenum chamber 15 from which a number of holes 16 give access from the plenum chamber to the space between pad 13 and plate 11.

The transition between the thicker part of pad 13 and the thinner part extending radially inwards therefrom, provides a step in which is accommodated an O-ring 17 the inner side of which rests in the corner between the surface of plate 12, facing pad 13 and a small cylindrical boss 18. This provides a resilient mounting for pad 13 permitting it to accommodate itself to irregularities in the surface 29 of plate 11 or its motions when running, these latter motions being permitted by the resilient mountings (O-rings 8 and 9) of the journal bearing sleeve 7.

Pressurised fluid is fed to pad 13 from fluid channels 19 and 20 in the casing 4 — the drawing shows a composite casing consisting of parts screwed together but for the purpose of this description all these parts are included under the reference numeral 4 —. Channel 20 leads into a block 21 to which is secured a spiral length of capillary tube 22 which encircles pad 13 over about an angle of 330°. Tube 22 provides a satisfactory flexible feed tube to the plenum chamber 15 and causes no significant fluid pressure drop. The whole thrust bearing assembly consisting of plates 11 and 12, pad 13, block 21 and tube 22, is encased within a cup-like end-cover 23.

Pressurised fluid applied via channels 19 and 20 and tube 22 to plenum chamber 15 escapes via holes 16 to the bearing space 28 between surface 14 of pad 13 and the annular facing surface 29 of thrust plate 11 giving rise to a force tending to increase the gap between these surfaces. The fluid escapes via the inner and outer margins of the bearing space 28. The outer leakage flows directly into the space 25 within end-cover 23 and the inner leakage travels axially to the left in the clearance between boss 18 and shaft 1 whence some of it escapes via the clearance between sleeve 7 and shaft 1 and the remainder passes radially outwards along holes 25 drilled in the thickness of plate 12. These holes 25 lead into an annular space between plate 12 and the rear face of pad 13 and thence via the outside of the latter into the space 24.

The pressure in plenum chamber 15 is substantially the same as the pressure applied from an external pumping source to channel 19. There is a pressure drop in passage through the holes 16, to a pressure which may conveniently be of the order of half the supply pressure. The fluid flowing outwardly from holes 16 within the bearing space 28 falls away to a pressure which would be substantially ambient pressure if space 24 were fully vented. However the exhaust passage from space 24 is restricted by means of adjustable restrictor orifice 26 so that a certain pressure builds up in space 24. The pressure in space 24 acts upon the left-hand face of pad 13 (opposite to that facing plate 12) and acts thereon to the right. The same pressure acts over the whole area of thrust plate 11 urging it to the left. This provides a net leftwards force on plate 11 equal to the pressure in space 24 acting on an area equal to the cross-sectional area of shaft 1.

The clearance 30 between sleeve 7 of the journal bearing, and shaft 1 running therein provides a leakage path from the space between boss 18 and shaft 1 and this leakage path is effectively in parallel with orifice 26. However clearance 30 is sufficiently small to avoid interference with the build-up of pressure in chamber 24. If any other type of journal bearing (e.g., a ball bearing) were to be used, a seal would have to be inserted to isolate the space between boss 18 and shaft 1. Where high rotational speeds are demanded such a seal is liable to fail. A fluid-dynamic bearing with minimal working clearance obviates the need for such a seal.

The way in which the bearing of the invention operates is diagrammatically illustrated in FIGS. 2, 3 and 4. The lower part of FIG. 2 shows a thrust pad representing pad 13 and similarly denoted, the lower face of which is opposed to a surface representing that of thrust plate 11. The upper part of FIG. 2 represents a graph of the pressure conditions in and around the bearing. The co-ordinate $P_0$ represents the ambient pressure outside the end cover 23, the co-ordinate $P_1$ represents the pressure obtaining within space 24 and the curve 27 represents the pressure conditions across the annular width of the bearing space 28. This pressure declines from a maximum $P_2$, at the exit of a hole 16, to the pressure $P_1$ in space 24 at the margins of the bearing space 28.

FIG. 3 illustrates what happens when the clearance space is increased, for instance by reason of an increased axial thrust acting to the right. The increased clearance between pad 13 and plate 11 increases the flow through the bearing which increases the pressure drop through hole 16 and lowers the pressure at the exit of hole 16 to a reduced pressure $P_2'$. Similarly the increased flow raises the pressure drop across restrictor hole 26 so that the pressure in space 24 rises to a higher valve $P_1'$.

FIG. 4 shows what happens if for any reason the bearing space 28 is reduced in thickness, for instance by reason of an increased axial thrust to the left on shaft 1. The reduction of the bearing clearance reduces the flow and the pressure drop across hole 16 so that the pressure around the exit of that hole rises to a new higher value $P_2''$ and the reduced flow further causes a fall in the pressure drop across restrictor hole 26 so that the pressure in space 24 drops to a new lower value $P_1''$.

In FIGS. 2, 3 and 4 the shaded area beneath the curves 27, 27' and 27'' represents the force acting rightwards on thrust plate 11 and this is represented by the arrow F in FIG. 2, whilst in FIG. 3 it is reduced to F' not only by reason of the rise of the base line of the area to the higher level of $P_1'$ but also by the fall of the peak pressure to the lower value of $P_2'$. Likewise in FIG. 4 the force acting rightwards on plate 11 rises to the higher value of F'' not only because of the lowering of the base line of the graph to the lower value $P_1''$ but also because of the rising of the peak to the higher value $P_2''$.

Where the shaft 1 is required to rotate at extremely high speeds (e.g., of the order of 120,000 r.p.m.) high frequency oscillatory forces acting axially of the rotational axis are likely to be encountered. It will not, in general, be practicable to provide opposing forces in the bearing pad, and the chamber 24, by means of the fluid flow through holes 16, which fluctuate at such high frequencies. To cope with this situation the area of surface 29 must be sufficiently large to provide dynamic stiffness to the thrust bearing due to the so-called "squeeze" effect, that is to say the resistance to the flow of fluid radially in the bearing clearance space between surfaces 29 and 14 in the presence of pressure peaks arising when these surfaces converge rapidly in the presence of high frequency axial oscillations of the shaft.

The embodiment of the invention described and illustrated in the accompanying drawings was intended to be supplied with gas (e.g., air) as the pressure medium but the invention is in principle applicable to the case where the pressure medium is a liquid (e.g., oil), the dimensions of the parts and flow passages being appropriately chosen to take account of the different characteristics (e.g., viscosity) of the different pressure medium.

the value of the force acting to the left on thrust plate 11 by virtue of the pressure in space 24 can be adjusted according to requirements, for instance it may be just sufficient to provide an initial leftwards preload upon a bearing normally loaded to the left or alternatively it may be arranged to provide virtually equal thrust bearing capacity either to the right or to the left. Up to a point these adjustments can be made by variation of the restrictor hole 26 provided that the alternative leakage path through the sleeve 7 is not too great. It will be clear however that further adjustments can be made by varying the relative areas facing right and facing left which act on the plate 11 for instance the diameter of shaft 1 could be reduced or increased.

I claim:

1. A thrust bearing comprising the following items in combination:
   a rotary member
   a fixed structure
   a journal bearing supporting the rotary member for rotation relative to the fixed structure about a rotational axis
   a thrust member attached to the rotary member
   a thrust bearing pad anchored to the fixed structure
   a thrust surface of the thrust member, generated by a line inclined to the rotational axis and a closely spaced opposed surface of the bearing pad defining between them a bearing space
   one or more feed holes in the said surface of the bearing pad, providing for the access of pressurised fluid to the bearing space
   passage means for supplying pressurised fluid to the said one or more feed holes
   a chamber surrounding the thrust member into which may flow fluid escaping from the bearing surface at least one fluid-flow-restricting passage for the escape of fluid from the chamber whereby pressure in excess of ambient pressure may build up in the chamber
   surfaces of the rotary member opposed to the thrust surface of the thrust member upon which pressure build up in the chamber acts in opposition to the forces due to pressurised fluid in the bearing space whereby the thrust bearing is capable of supporting laods, applied along the rotational axis, in either direction.

2. A bearing according to claim 1 with resilient mounting means for the bearing pad in the fixed structure, which permit the bearing pad to make limited longitudinal and rocking movements relative to the axis of rotation.

3. A bearing according to claim 1 comprising a cavity or plenum chamber within the bearing pad the said one or more feed holes taking the form of one or more fluid-flow-restricting orifices between the said cavity or plenum chamber and the bearing space and with passage means for supplying pressurised fluid to the said cavity or plenum chamber.

4. A bearing according to claim 3 in which the said passage means comprises a coiled capillary tube anchored at one end to the fixed structure, passages in the fixed structure for the supply of pressurised fluid, the said one end of the capillary tube communicating with such passages, the other end of the capillary tube being anchored to the bearing pad and communicating with the cavity or plenum chamber therein.

5. A bearing according to claim 1 in which the said journal bearing adjoins the thrust bearing and takes the form of a fluid dynamic bearing comprising a cylindrical element surrounded by a sleeve, the two being relatively rotatable and one being anchored to or integral with the fixed structure and the other being anchored to or integral with the rotary member, the said sleeve and cylindrical element having a minimal clearance between them which clearance provides a minimal leakage path from the said chamber, whereby a fluid-tight seal between the thrust bearing and the journal bearing may be dispensed with.

6. A bearing according to claim 1 in which the opposed surfaces of the thrust member and the bearing pad have an area sufficiently large to provide resistance to the flow of fluid in the bearing space radially of the axis of rotation, in the presence of oscillatory forces acting axially on the rotary member at a frequency higher than that at which the pressure in the bearing space and the said chamber due to the flow of fluid through the said feed holes, can be caused to fluctuate, whereby the bearing has a dynamic stiffness tending to oppose such oscillatory forces.

7. A bearing as claimed in claim 1 in which the thrust surface of the thrust member and the opposed surface of the bearing pad respectively lie in parallel planes normal to the rotational axis of the rotary member.

* * * * *

PO-1050
(5/69)

UNITED STATES PATENT OFFICE
CERTIFICATE OF CORRECTION

Patent No. 3,761,151            Dated Sept. 25, 1973

Inventor(s) John Kerr

It is certified that error appears in the above-identified patent and that said Letters Patent are hereby corrected as shown below:

Cover page, after item [21] insert --
[30] Foreign Application Priority Data
    Aug. 18, 1971  Great Britain 38765/71--.
Column 4, line 56, "build" should read --built--.

Signed and sealed this 12th day of March 1974.

(SEAL)
Attest:

EDWARD M. FLETCHER, JR.            C. MARSHALL DANN
Attesting Officer                     Commissioner of Patent